US012795580B2

(12) United States Patent
Murthy et al.

(10) Patent No.: US 12,795,580 B2
(45) Date of Patent: Nov. 10, 2026

(54) WIRELESS ACCESS ACROSS MULTIPLE FABRIC SITES USING A TRANSIT CONTROL PLANE

(71) Applicant: Cisco Technology, Inc., San Jose, CA (US)

(72) Inventors: Shree Narasimha Murthy, San Jose, CA (US); Sanjay Kumar Hooda, Pleasanton, CA (US); Balaji Pitta Venkatachalapathy, San Ramon, CA (US); Raja Janardanan, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 18/826,574

(22) Filed: Sep. 6, 2024

(65) Prior Publication Data

US 2026/0075561 A1 Mar. 12, 2026

(51) Int. Cl.
*H04W 60/04* (2009.01)
*H04W 28/086* (2023.01)

(52) U.S. Cl.
CPC ......... *H04W 60/04* (2013.01); *H04W 28/086* (2023.05)

(58) Field of Classification Search
CPC ............................ H04W 60/04; H04W 28/086
USPC ...................................................... 455/435.1
See application file for complete search history.

(56) References Cited

U.S. PATENT DOCUMENTS

| | | | | |
|---|---|---|---|---|
| 7,539,169 B1 * | 5/2009 | O'Hara, Jr. | ........... | H04W 48/06 370/338 |
| 2005/0198337 A1 * | 9/2005 | Sun | .................. | H04W 36/0016 455/436 |
| 2007/0297371 A1 * | 12/2007 | Lea | ...................... | H04W 40/20 370/334 |

(Continued)

FOREIGN PATENT DOCUMENTS

EP 3706373 A1 9/2020

OTHER PUBLICATIONS

Chatterjee A., "SDA and Wireless Part II—AP Onboarding", The ASCII Construct, Jan. 13, 2022, Retrieved from https://www.theasciiconstruct.com/post/sda_wireless_2/ on Jun. 5, 2024, pp. 1-16.

(Continued)

*Primary Examiner* — Don N Vo
(74) *Attorney, Agent, or Firm* — Lee & Hayes, P.C.

(57) ABSTRACT

In one embodiment, a method includes receiving, by a transit control plane node from a wireless controller, information corresponding to a first access point associated with a first fabric site and receiving, by the transit control plane node from the wireless controller, information corresponding to a second access point associated with a second fabric site. The method further includes registering, by the transit control plane node, a first set of wireless clients associated with the first access point and a second set of wireless clients associated with the second access point to provide network services to the first set of wireless clients and the second set of wireless clients associated with the second access point and selectively updating, by the transit control plane node, the information corresponding to the first set of wireless clients associated with the first access point and the infor- (Continued)

mation corresponding to the second set of wireless clients associated with the second access point.

20 Claims, 5 Drawing Sheets

(56) References Cited

U.S. PATENT DOCUMENTS

| | | | | |
|---|---|---|---|---|
| 2014/0334405 | A1* | 11/2014 | Chen | H04W 16/06 370/329 |
| 2020/0359273 | A1* | 11/2020 | Kumar | H04W 12/73 |
| 2021/0135984 | A1 | 5/2021 | Jain et al. | |
| 2021/0185752 | A1 | 6/2021 | Samuel et al. | |
| 2022/0029915 | A1* | 1/2022 | Moreno | H04L 45/74 |
| 2024/0056412 | A1 | 2/2024 | Jain et al. | |

OTHER PUBLICATIONS

Zindagi Technologies: “Roles and Terminology for the SD-Access Fabric”, Zindagi Technologies, May 13, 2022, Retrieved from https://zindagitech.com/roles-and-terminology-for-the-sd-access-fabric/ on Jun. 5, 2024, pp. 1-7.

* cited by examiner

WIRELESS ACCESS ACROSS MULTIPLE FABRIC SITES USING A TRANSIT CONTROL PLANE

TECHNICAL FIELD

The present disclosure relates generally to computer networks, and, more particularly, to wireless access across multiple fabric sites using a transit control plane.

BACKGROUND

In general, software defined architectures (SDAs), such as wireless SDAs, that are deployed across multiple fabric sites manage wireless endpoints locally. That is, a wireless controller (WLC) is generally present (e.g., locally deployed) within each particular fabric site of a wireless SDA deployment. These locally deployed WLCs generally communicate with one or more access points (APs) and/or one or more control nodes within the particular fabric site in which the WLC is deployed.

This paradigm allows for the WLC to facilitate communication between multiple wireless devices that may be operating within the particular fabric site in which the WLC is deployed. However, as the quantity of wireless devices associated to a particular fabric site increase, it may become difficult for a single WLC to handle ever-increasing traffic on the fabric site on which the WLC is deployed. Further, as workers, corporations, and entities become increasingly spread out across multiple fabric sites, it may become difficult for a localized WLC to adequately facilitate communication between multiple wireless devices when such wireless devices are roam to or are generally located across different fabric sites.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method includes receiving, by a transit control plane node from a wireless controller, information corresponding to a first access point associated with a first fabric site and receiving, by the transit control plane node from the wireless controller, information corresponding to a second access point associated with a second fabric site. The method further includes registering, by the transit control plane node, a first set of wireless clients associated with the first access point and a second set of wireless clients associated with the second access point to provide network services to the first set of wireless clients and the second set of wireless clients associated with the second access point and selectively updating, by the transit control plane node, the information corresponding to the first set of wireless clients associated with the first access point and the information corresponding to the second set of wireless clients associated with the second access point.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
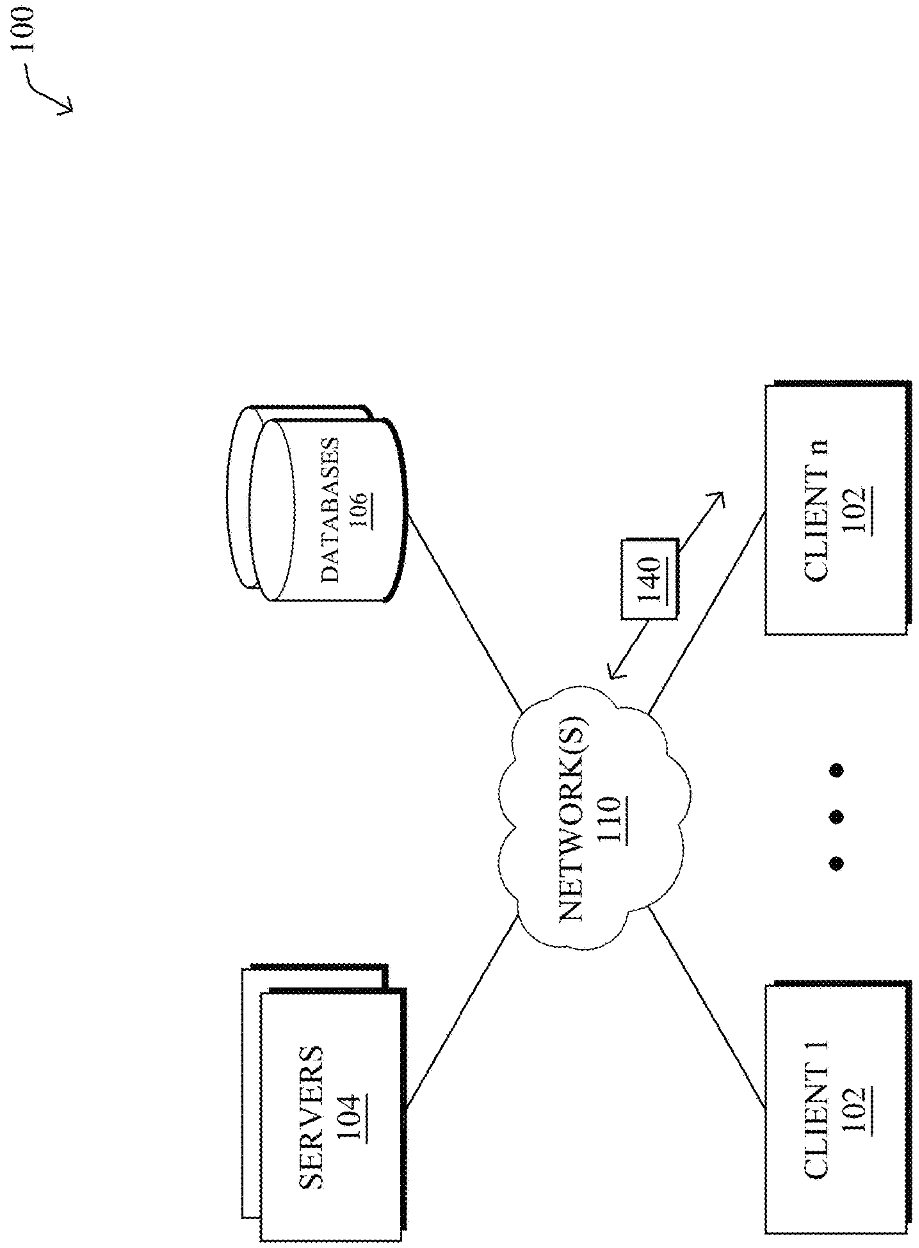
FIG. 1 illustrates an example computing system.

FIG. 1 is a schematic block diagram of an example simplified computing system (e.g., computing system 100) illustratively comprising any number of client devices (e.g., client devices 102, such as a first through $n^{th}$ client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
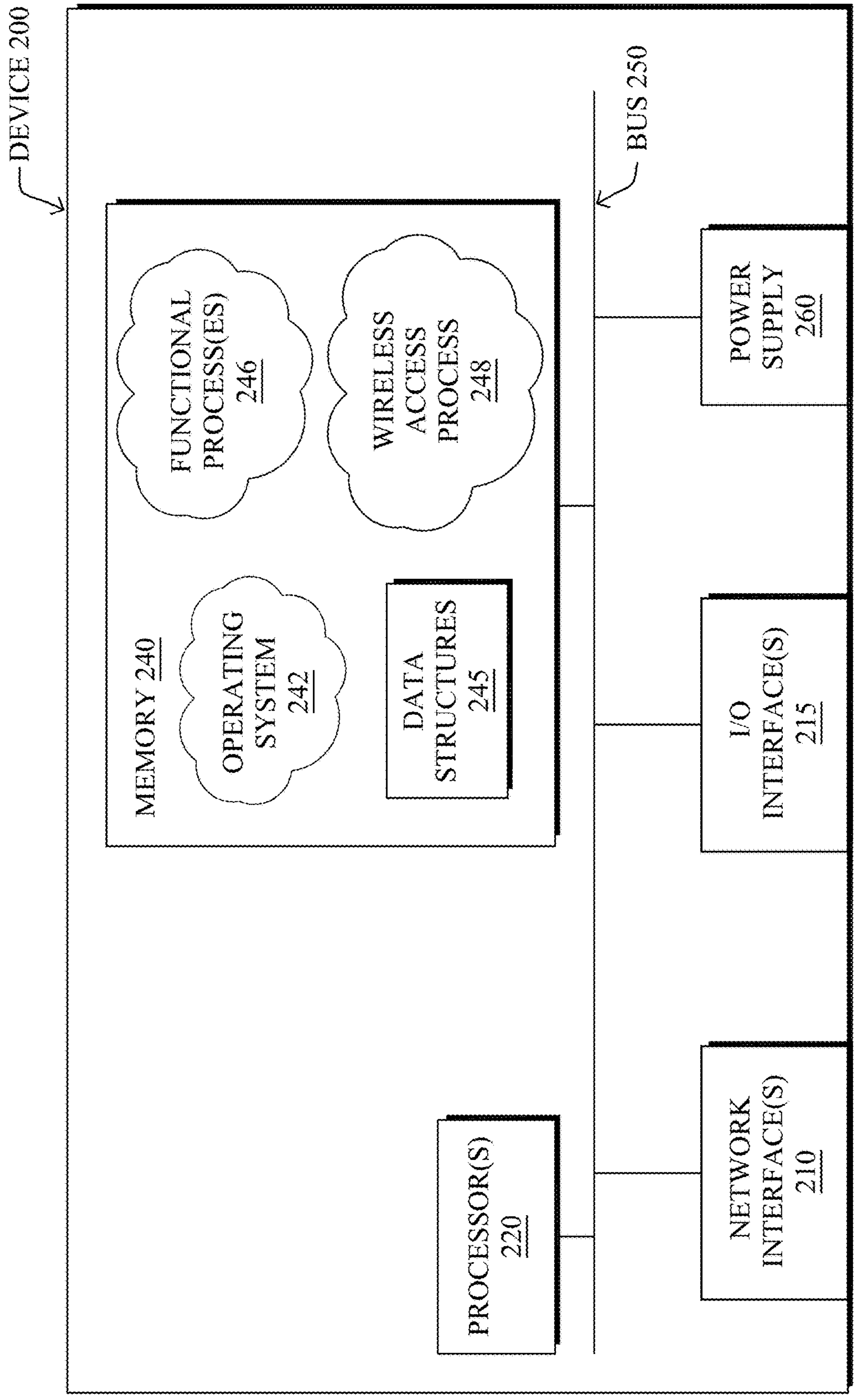
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a wireless access process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

For instance, one or more functional processes 246 may include computer executable instructions executed by the processor(s) 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, the one or more functional processes 246 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, one or more functional processes 246 and/or wireless access process (process 248) may include computer executable instructions that, when executed by processor(s) 220, cause device 200 to perform the techniques described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

Wireless Access Across Multiple Fabric Sites Using a Transit Control Plane

As noted above, in general, wireless software defined architectures (SDAs) that are deployed across multiple fabric sites manage wireless endpoints locally. That is, a wireless controller (WLC) is generally present (e.g., locally deployed) within each particular fabric site of a wireless SDA deployment. These locally deployed WLCs generally communicate with one or more access points (APs) and/or one or more control nodes within the particular fabric site in which the WLC is deployed.

However, as the quantity of wireless devices associated to a particular fabric site increase, it may become difficult for a single WLC to handle ever-increasing traffic on the fabric site on which the WLC is deployed. Further, as workers, corporations, and entities become increasingly spread out across multiple fabric sites, it may become difficult for a localized WLC to adequately facilitate communication between multiple wireless devices when such wireless devices are roam to or are generally located across different fabric sites.

In particular, although current approaches may allow for wireless access to be integrated in the fabric, such approaches generally do not allow for a same wireless subnet to be present across multiple fabric sites. In addition, current approaches often suffer from shortcomings in scalability, particularly as the number of fabric sites in a given architecture increases.

The techniques herein, therefore, provide for methodologies that eliminate the limitation of having a wireless controller at each fabric site and at the same time allow for scalability to many fabric sites using the concept of transit control plane nodes. Further, aspects of the present disclosure allow for a same wireless subnet to be present across multiple fabric sites. These and other aspects of the present disclosure allow for a scalable and flexible architecture for managing access points (APs) and wireless clients across multiple fabric sites using a single wireless controller (WLC).

Specifically, a method includes receiving, by a transit control plane node from a wireless controller, information corresponding to a first access point associated with a first fabric site and receiving, by the transit control plane node from the wireless controller, information corresponding to a second access point associated with a second fabric site. The method further includes registering, by the transit control plane node, a first set of wireless clients associated with the first access point and a second set of wireless clients associated with the second access point to provide network services to the first set of wireless clients and the second set of wireless clients associated with the second access point and selectively updating, by the transit control plane node, the information corresponding to the first set of wireless clients associated with the first access point and the information corresponding to the second set of wireless clients associated with the second access point.

Figure 3:
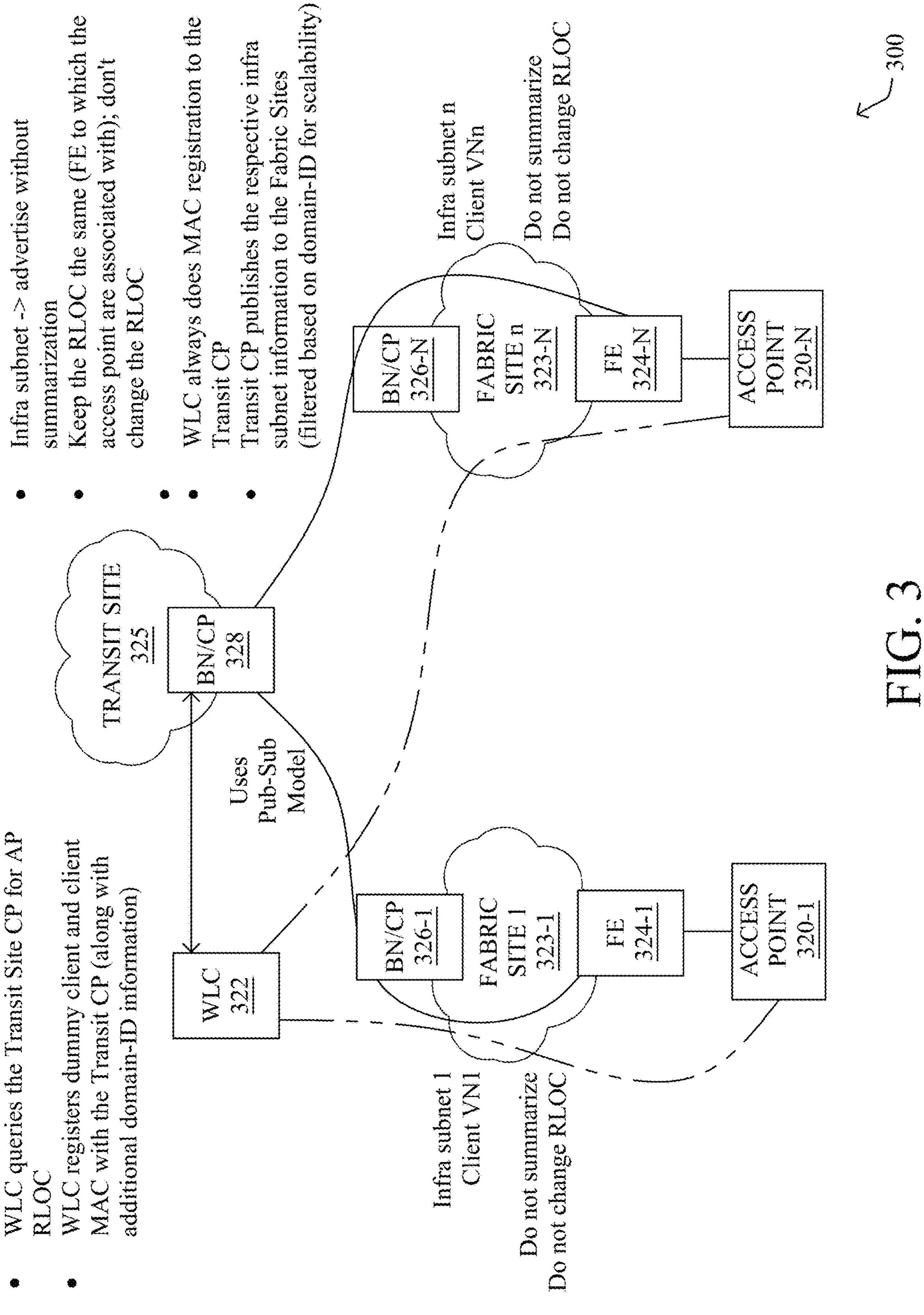
FIG. 3 illustrates an example architecture for wireless access across multiple fabric sites using a transit control plane.

Operationally, FIG. 3 illustrates an example architecture for wireless access across multiple fabric sites using a transit control plane. As shown in FIG. 3, the architecture 300 includes multiple fabric sites (i.e., a first fabric site 323-1 through an $N^{th}$ fabric site 323-N). A fabric site may be an independent fabric area with a unique set of network devices, such as control plane, border, edge, wireless controller, ISE PSN, etc. Different levels of redundancy and scale can be designed per site by including local resources such as DHCP, AAA, DNS, Internet, and so on. In general, a fabric site can cover a single physical location, multiple locations, or only a subset of a location. For example:

Single location: branch, campus, or metro campus;

Multiple locations: metro campus+multiple branches;

Subset of a location: building or area within a campus, etc.

A Software-Defined Access fabric network may comprise multiple sites. Each site therefore may have the benefits of scale, resiliency, survivability, and mobility. The overall aggregation of fabric sites can accommodate a large number of endpoints and can scale modularly or horizontally. Multiple fabric sites can be interconnected using a transit site.

As shown in FIG. 3, each of the fabric sites can include a respective border node and/or control plane node (e.g., the first fabric site 323-1 can include a respective border node (BN) and/or control plane node (CP), a first BN/CP 326-1, the $N^{th}$ fabric site 323-N can include a respective border node and/or control plane node, an $N^{th}$ BN/CP 326-N, etc.). In addition, each of the fabric sites can include a respective fabric edge node (e.g., the first fabric site 323-1 can include a respective fabric edge node, a first FE 324-1, the $N^{th}$ fabric site 323-N can include a respective fabric edge node, an $N^{th}$ FE 324-N, etc.). As shown in FIG. 3, the respective fabric edge nodes can be in communication with respective access points (e.g., the first FE 324-1 can be in communication with a first access point, AP 320-1, the $N^{th}$ FE 324-N can be in communication with an $N^{th}$ access point, AP 320-N, etc.).

In addition, the architecture 300 includes a transit site 325. As shown in FIG. 3, the transit site 325 includes border node and/or control plane node, a transit site BN/CP 328. A transit site can be a site that interconnects two or more fabric sites or connects the fabric site with external networks (e.g., Internet, data center, and so on). There are two types of transit networks:

IP transit: Uses a regular IP network to connect to an external network or to connect two or more fabric sites. These types of transit sites can leverage a traditional IP-based (VRF-LITE, MPLS) network, which requires remapping of VRFs and SGTs between sites.

SD-Access transit: Uses LISP/VxLAN encapsulation to connect two fabric sites. The SD-Access transit area may be defined as a portion of the fabric that has its own control plane nodes but does not have edge or border nodes. However, it can work with a fabric that has an external border. With an SD-Access transit, an end-to-end policy plane is maintained using SGT group tags.

The transit site 325 and the fabric sites are in communication with a wireless controller 322 (or "WLC" for brevity). As will be appreciated, the WLC can be a wireless LAN controller that is configured to monitor and manage access points in an organization (e.g., across multiple fabric sites). In some implementations, and in contrast to current approaches, a single wireless controller (wireless controller 322) can be configured to facilitate communication between all the fabric sites and the transit site 325, as discussed in more detail, herein.

In accordance with the disclosure, and as discussed in more detail, herein, all the access points (e.g., the first access point, AP 320-1 through the $N^{th}$ access point, AP 320-N) and the wireless endpoints (e.g., the first FE 324-1 through the $N^{th}$ FE 324-N, the first BN/CP 326-1 through the $N^{th}$ BN/CP 326-N, etc.) across multiple fabric sites (e.g., first fabric site 323-1 through the $N^{th}$ fabric site 323-N) can be allowed to be registered with a single common wireless controller, such as the wireless controller 322.

In some implementations, each of the fabric sites can have a different AP subnet (e.g., an infra virtual network or "INFRA_VN") and client subnets (e.g., a client virtual network or "CLIENT_VN"), although it is noted that a single client subnet may also be allowed. In addition, each of the fabric sites can have their own border node and control plane node, as mentioned above. Further, in some implementations, there can be a transit site 325 defined which includes a border node/control plane node (e.g., the transit site BN/CP 328).

In some implementations, the BN/CP node associated with each of the fabric sites can advertise registration information from the INFRA_VN without summarization to the transit control plane. That is, each of BN/CP nodes associated with the fabric sites can register subnet mask entries (e.g., /32 entries, etc.) with the transit site BN/CP 328 node. The registration message can include the Domain-ID of the fabric site (e.g., the Domain-ID of each of the fabric sites in the architecture 300). In some implementations, the registration message can further include a routing locator (RLOC). This RLOC can be an original RLOC that points to a fabric edge node to which a particular access point is associated with of an endpoint corresponding to the subnet mask entry of said access point.

In contrast to previous approaches, this additional information (i.e., the RLOC that points to the fabric edge node to which the particular access point is associated with of the endpoint corresponding to the subnet mask entry of said access point) can be exchanged with the transit site BN/CP 328 node (which can be referred to herein in the alternative as the "transit control plane node," i.e., the "T-CP" described in more detail in connection with FIG. 4, herein) using, for example, a private Location Identity Separation Protocol (LISP) Canonical Address Format (LCAF) extension that is added to the registration message when the registration message comprises a LISP registration message. Implementations are not limited to these specified protocols, however, and it will be appreciated that other registration messages using different protocols and/or differing methodologies, such as multi-site RR (in case of BGP-EVPN), are contemplated within the scope of the disclosure.

Upon AP registration with the wireless controller 322, the wireless controller 322 can query the transit site BN/CP 328 node (e.g., the transit control plane node) for the RLOC of the AP that has registered with the wireless controller 322. Next, the transit site BN/CP 328 node can reply with the original RLOC of the AP, which can include information corresponding to the FE node (e.g., the first FE 324-1, etc.) to which the AP is associated and the domain identification (Domain_ID) associated with the AP.

The wireless controller 322 can then use the obtained RLOC to register both a dummy client and wireless clients that are associated with the AP. In addition, in some implementations, the registration message can be augmented with the private LCAF extension to send the Domain-ID information that was obtained from the transit site BN/CP 328 node during the RLOC query thereby augmenting the existing messages with the Domain-ID information in a new private LCAF.

The transit site BN/CP 328 node can use the Domain_ID information to selectively update the fabric BN/CPs about the dummy client and wireless client registration information. This filtering mechanism can ensure that the propagation of the wireless endpoints to the fabric sites from the transit site BN/CP 328 node is scalable, and that each fabric site is informed only about the wireless endpoints that are present in that fabric site.

Figure 4:
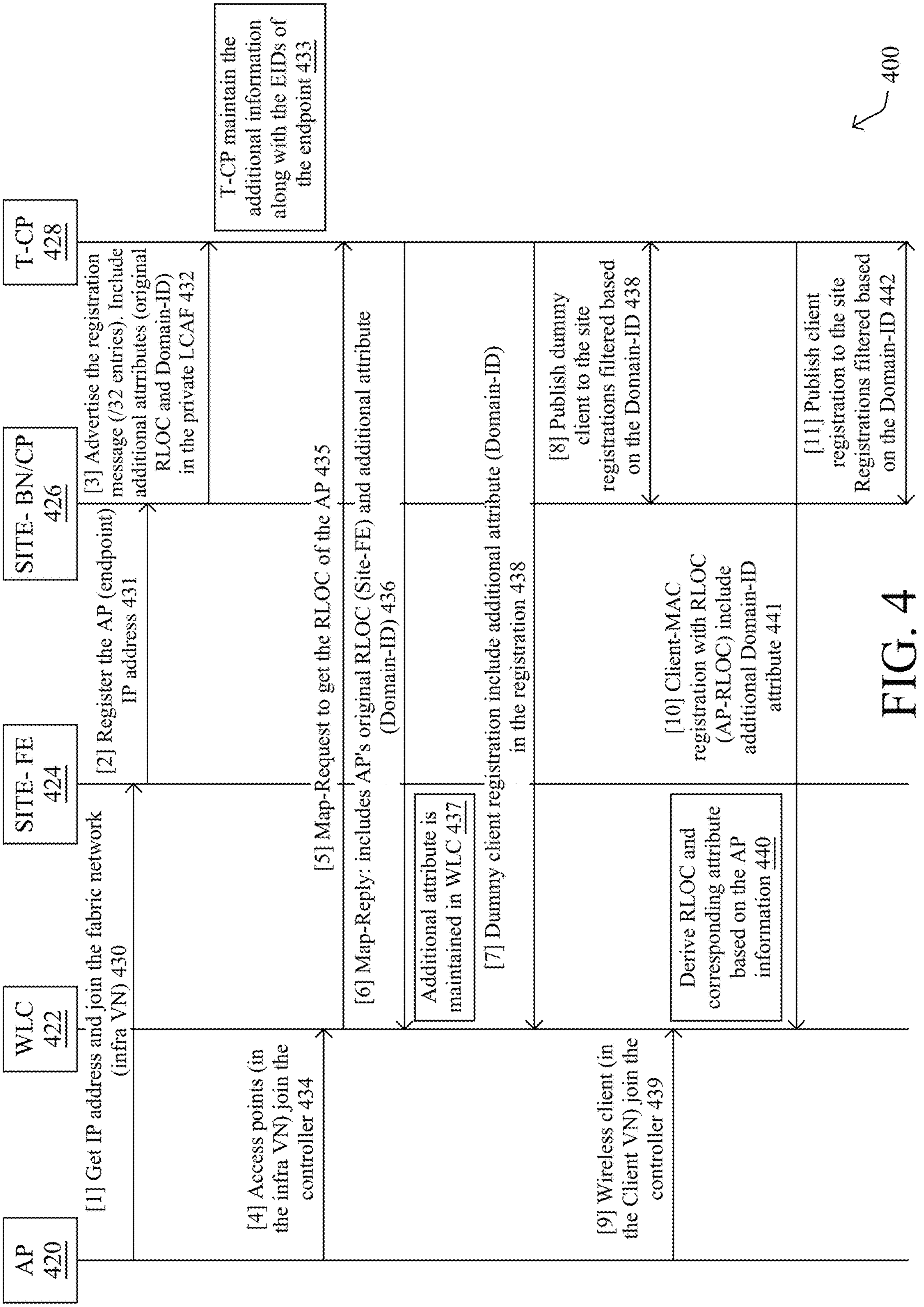
FIG. 4 illustrates an example sequence diagram for wireless access across multiple fabric sites using a transit control plane.

FIG. 4 illustrates an example sequence diagram 400 for wireless access across multiple fabric sites using a transit control plane. The example sequence diagram 400 illustrates an example flow of operations that take place in sequence and using different components of the architecture 300 of FIG. 3. According, the AP 420 can be analogous to one of the APs (e.g., first access point, AP 320-1 through the $N^{th}$ access point, AP 320-N), the WLC 422 can be analogous to the wireless controller 322, the SITE-FE 424 can be analogous to one of the fabric edge nodes (e.g., the first FE 324-1 through the $N^{th}$ FE 324-N), the SITE-BN/CP 426 can be analogous to one of the border nodes/control plane nodes of the fabric sites (e.g., the first BN/CP 326-1 through the $N^{th}$ BN/CP 326-N), and the T-CP 428 can be analogous to the transit site BN/CP 328 of FIG. 3.

At operation 430, the SITE-FE 424 retrieves the internet protocol (IP) address and joins a fabric network using the AP 420 subnet (e.g., INFRA_VN). Next, at operation 431, the SITE-BN/CP 426 registers the address of the AP (e.g., the endpoint). At operation 432, the registration message (which, as discussed above can include one or more /32 messages) is advertised to the T-CP 428. In some implementations, additional attributes, such as the RLOC and Domain_ID can be included in the private LCAF as part of the registration message. Subsequently, at operation 433, the T-CP 428 can maintain this additional information (e.g., the registration and/or the additional attributes included in the registration message) in addition to endpoint identifiers associated with the endpoint(s) of the architecture 300.

At operation 434, the AP 420 (e.g., APs in the INFRA_VN) can join the WLC 422. Next, at operation 435, the WLC 422 maps a request to retrieve the RLOC of the AP to the T-CP 428. At operation 436, the T-CP 428 sends a reply message to the map request sent at operation 435. The reply message can include the original RLOC of the AP (e.g., the Site-FE) as well as additional attributes that were obtained at operation 431 and/or at operation 432. At operation 437, the information contained in the reply message (e.g., the original RLOC of the AP and the additional attributes) can be maintained by the WLC 422.

At operation 438, the Site-BN/CP 426 and the T-CP 428 establish one or more dummy clients by publishing the dummy client to the site registration list. In some implementations, information associated with publishing the dummy client to the site registrations can be filtered based on the Domain-ID. Next, at operation 439, a wireless client in the CLIENT_VN can be allowed to join the WLC 422. At operation 440, the RLOC and corresponding attributes for the wireless client can be derived based on information associated with the AP 420. Then, at operation 441, MAC registration for the wireless client can be performed with the RLOC (e.g., the RLOC associated with the AP) and the Domain_ID discussed above. Subsequently, at operation 442, the client (e.g., wireless client) registration to the fabric site and/or transit site can be published. In some implementations, information associated with publishing the wireless client to the site registrations can be filtered based on the Domain-ID.

Figure 5:
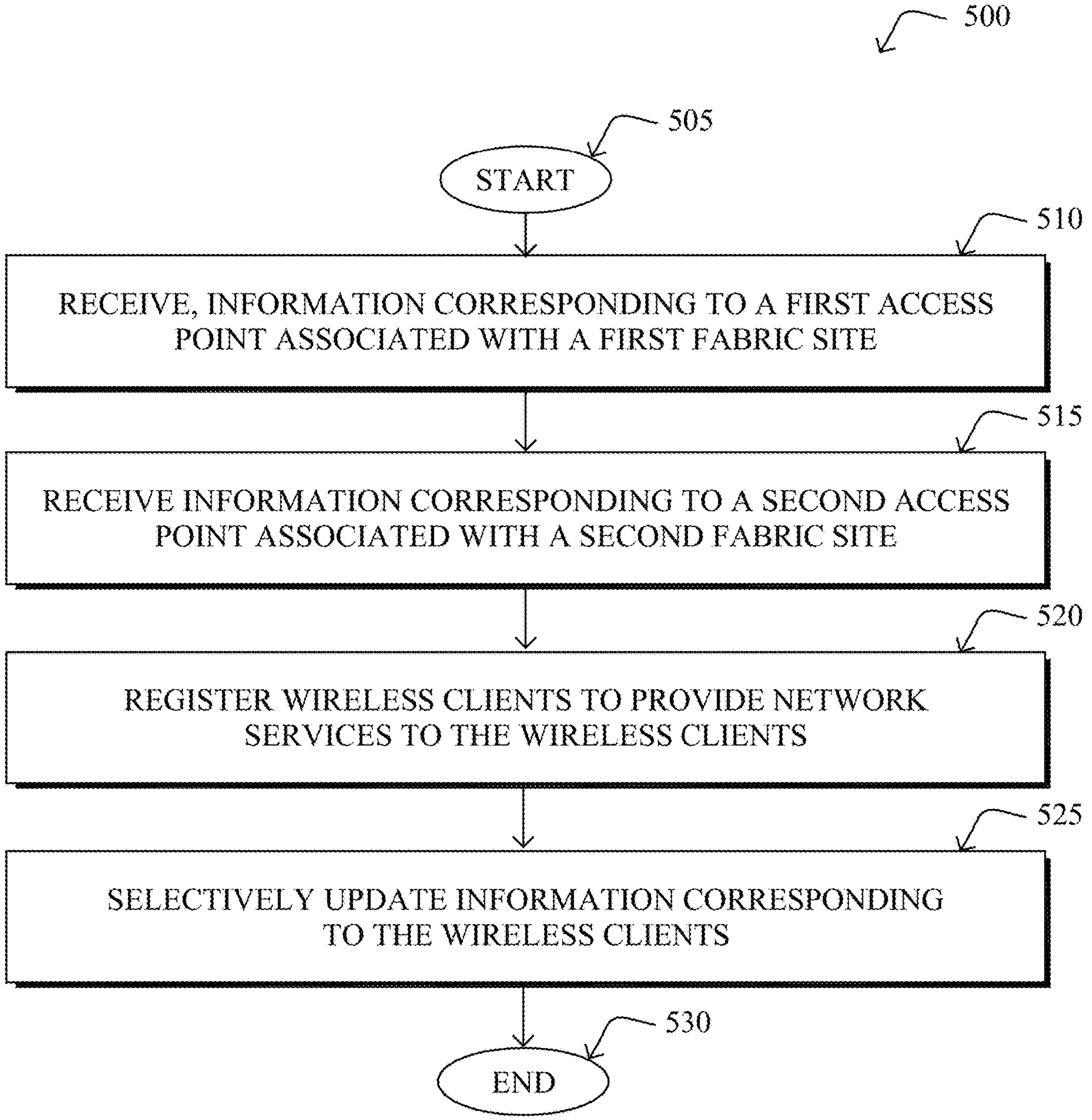
FIG. 5 illustrates an example procedure for wireless access across multiple fabric sites using a transit control plane.

FIG. 5 illustrates an example procedure for wireless access across multiple fabric sites using a transit control plane. For example, a non-generic, specifically configured device (e.g., device 200, an apparatus) may perform procedure 500 by executing stored instructions (e.g., process 248). The procedure 500 may start at step 505, and continues to step 510, where, as described in greater detail above, a transit control plane node receives, from a wireless controller, information corresponding to a first access point associated with a first fabric site. In some implementations, the transit control plane node can be deployed on a transit control plane communicatively coupled to the first fabric site and the second fabric site.

Procedure 500 may continue to step 515 where, as described in greater detail above, a transit control plane node receives, from the wireless controller, information corresponding to a second access point associated with a second fabric site. In some implementations, the wireless controller and the transit control plane node may be neither within the first fabric site nor the second fabric site. That is, in some implementations, the wireless controller can be deployed in a location that is different than a location associated with the transit control plane node, the first fabric site and the second fabric site and/or the transit control plane node can be deployed in a location that is different than a location associated with the wireless controller, the first fabric site and the second fabric site.

Procedure 500 may continue to step 520 where, as described in greater detail above, the transit control plane node registers a first set of wireless clients associated with the first access point and a second set of wireless clients associated with the second access point to provide network services to the first set of wireless clients and the second set of wireless clients associated with the second access point. In some implementations, the procedure 500 can further include transmitting, to the wireless controller, a first registration message to initiate registering the first access point and transmitting, to the wireless controller, a second registration message to initiate registering the second access point, wherein the first registration message and the second registration message are augmented with domain identifier information in a private Location Identity Separation Protocol Canonical Address Format.

Procedure 500 may continue to step 525 where, as described in greater detail above, the transit control plane node selectively updates the information corresponding to the first set of wireless clients associated with the first access point and the information corresponding to the second set of wireless clients associated with the second access point. As discussed above, in some implementations, the procedure 500 can further include selectively updating, by the transit control plane node, the information corresponding to the first set of wireless clients and information corresponding to the second set of wireless clients associated with the second access point such that only the first fabric site is informed about updates involving the first set of wireless clients and only the second fabric site is informed about updates involving the second set of wireless clients associated with the second access point.

In some implementations, the information associated with the first fabric site and the information associated with the second fabric site comprises a routing locator associated with the first access point, a routing locator associated with the second access point, a domain identifier associated with the first access point, and a domain identifier associated with the second access point and the transit control plane node is configured to maintain the information associated with the first fabric site and the information associated with the second fabric site. In such implementations, the routing locator associated with the first access point can correspond to a fabric edge node of the first fabric site and is associated with the first access point and the routing locator associated with the second access point can correspond to a fabric edge node of the second fabric site and is associated with the second access point.

As discussed above, in some implementations, the first fabric site can have at least one of a first access point subnet, a first client subnet, a first border node, and a first control plane node associated therewith and the second fabric site can have at least one of a second access point subnet, a second client subnet, a second border node, and a second control plane node associated therewith.

In some implementations, the transit control plane node can be configured to publish client registration information to the first fabric site based on a domain identifier associated with the first access point and publish client registration information to the second fabric site based on a domain identifier associated with the second access point.

In some implementations, the procedure 500 can further include receiving, by the transit control plane node, registration information to establish a dummy client, wherein the registration information includes a routing locator associated with at least one of the first access point and the second access point, wherein the registration information further includes domain identification information corresponding to at least one of the first access point and the second access point and publishing the registration information to at least one of the first fabric site and the second fabric site.

Procedure 500 may end at step 530.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: receiving, by a transit control plane node from a wireless controller, information corresponding to a first access point associated with a first fabric site; receiving, by the transit control plane node from the wireless controller, information corresponding to a second access point associated with a second fabric site; registering, by the transit control plane node, a first set of wireless clients associated with the first access point and a second set of wireless clients associated with the second access point to provide network services to the first set of wireless clients and the second set of wireless clients associated with the second access point; and selectively updating, by the transit control plane node, the information corresponding to the first set of wireless clients associated with the first access point and the information corresponding to the second set of wireless clients associated with the second access point.

In still other implementations, a tangible, non-transitory, computer-readable medium storing program instructions that cause a device to execute a process comprising: receiving, by a transit control plane node from a wireless controller, information corresponding to a first access point associated with a first fabric site; receiving, by the transit control plane node from the wireless controller, information corresponding to a second access point associated with a second fabric site; registering, by the transit control plane node, a first set of wireless clients associated with the first access point and a second set of wireless clients associated with the second access point to provide network services to the first set of wireless clients and the second set of wireless clients associated with the second access point; and selectively updating, by the transit control plane node, the information corresponding to the first set of wireless clients associated with the first access point and the information corresponding to the second set of wireless clients associated with the second access point.

The techniques described herein, therefore, provide for wireless access across multiple fabric sites using a transit control plane. As discussed above, the techniques herein can allow for a scalable and flexible architecture for managing APs and wireless clients across multiple fabric sites using a single wireless controller. These techniques can provide for elimination the limitation of having a wireless controller at each fabric site and at the same time allow for scalability to many fabric sites using the concept of transit control plane nodes. Further, aspects of the present disclosure allow for a same wireless subnet to be present across multiple fabric sites, thereby further improving scalability and flexibility in large-scale wireless network deployments.

Illustratively, the techniques described herein may be performed by hardware, software, and/or firmware, (e.g., an "apparatus") such as in accordance with the wireless access process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof.

Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

receiving, by a transit control plane node from a wireless controller, information corresponding to a first access point associated with a first fabric site;

receiving, by the transit control plane node from the wireless controller, information corresponding to a second access point associated with a second fabric site;

registering, by the transit control plane node, a first set of wireless clients associated with the first access point and a second set of wireless clients associated with the second access point to provide network services to the first set of wireless clients and the second set of wireless clients associated with the second access point; and selectively updating, by the transit control plane node, the information corresponding to the first set of wireless clients associated with the first access point and the information corresponding to the second set of wireless clients associated with the second access point.

2. The method of claim 1, wherein the wireless controller and the transit control plane node are neither within the first fabric site nor the second fabric site.

3. The method of claim 1, wherein the transit control plane node is deployed on a transit control plane communicatively coupled to the first fabric site and the second fabric site.

4. The method of claim 1, further comprising:

transmitting, to the wireless controller, a first registration message to initiate registering the first access point; and transmitting, to the wireless controller, a second registration message to initiate registering the second access point, wherein the first registration message and the second registration message are augmented with domain identifier information in a private Location Identity Separation Protocol Canonical Address Format.

5. The method of claim 1, wherein:

the information associated with the first fabric site and the information associated with the second fabric site comprises a routing locator associated with the first access point, a routing locator associated with the second access point, a domain identifier associated with the first access point, and a domain identifier associated with the second access point, and the transit control plane node is configured to maintain the information associated with the first fabric site and the information associated with the second fabric site.

6. The method of claim 5, wherein:

the routing locator associated with the first access point corresponds to a fabric edge node of the first fabric site and is associated with the first access point, and the routing locator associated with the second access point corresponds to a fabric edge node of the second fabric site and is associated with the second access point.

7. The method of claim 1, wherein:

the first fabric site has at least one of a first access point subnet, a first client subnet, a first border node, and a first control plane node associated therewith, and the second fabric site has at least one of a second access point subnet, a second client subnet, a second border node, and a second control plane node associated therewith.

8. The method of claim 1, wherein selectively updating further comprises:

selectively updating, by the transit control plane node, the information corresponding to the first set of wireless clients and information corresponding to the second set of wireless clients associated with the second access point such that only the first fabric site is informed about updates involving the first set of wireless clients and only the second fabric site is informed about updates involving the second set of wireless clients associated with the second access point.

9. The method of claim 1, wherein the transit control plane node is configured to:

publish client registration information to the first fabric site based on a domain identifier associated with the first access point, and publish client registration information to the second fabric site based on a domain identifier associated with the second access point.

10. The method of claim 1, further comprising:

receiving, by the transit control plane node, registration information to establish a dummy client, wherein the registration information includes a routing locator associated with at least one of the first access point and the second access point, wherein the registration information further includes domain identification information corresponding to at least one of the first access point and the second access point; and publishing the registration information to at least one of the first fabric site and the second fabric site.

11. An apparatus, comprising:

one or more network interfaces to communicate with a network;

a processor coupled to the one or more network interfaces and configured to execute one or more processes; and a memory configured to store a process that is executable by the processor, the process comprising:

receiving, by a transit control plane node from a wireless controller, information corresponding to a first access point associated with a first fabric site;

receiving, by the transit control plane node from the wireless controller, information corresponding to a second access point associated with a second fabric site;

registering, by the transit control plane node, a first set of wireless clients associated with the first access point and a second set of wireless clients associated with the second access point to provide network services to the first set of wireless clients and the second set of wireless clients associated with the second access point; and selectively updating, by the transit control plane node, the information corresponding to the first set of wireless clients associated with the first access point and the information corresponding to the second set of wireless clients associated with the second access point.

12. The apparatus of claim 11, wherein the wireless controller and the transit control plane node are neither within the first fabric site nor the second fabric site.

13. The apparatus of claim 11, the process further comprising:

transmitting, to the wireless controller, a first registration message to initiate registering the first access point; and transmitting, to the wireless controller, a second registration message to initiate registering the second access point, wherein the first registration message and the second registration message are augmented with domain identifier information in a private Location Identity Separation Protocol Canonical Address Format.

14. The apparatus of claim 11, wherein:

the information associated with the first fabric site and the information associated with the second fabric site comprises a routing locator associated with the first access point, a routing locator associated with the second access point, a domain identifier associated with the first access point, and a domain identifier associated with the second access point, and the transit control plane node is configured to maintain the information associated with the first fabric site and the information associated with the second fabric site.

15. The apparatus of claim 14, wherein:

the routing locator associated with the first access point corresponds to a fabric edge node of the first fabric site and is associated with the first access point, and the routing locator associated with the second access point corresponds to a fabric edge node of the second fabric site and is associated with the second access point.

16. The apparatus of claim 11, wherein:

the first fabric site has at least one of a first access point subnet, a first client subnet, a first border node, and a first control plane node associated therewith, and the second fabric site has at least one of a second access point subnet, a second client subnet, a second border node, and a second control plane node associated therewith.

17. The apparatus of claim 11, wherein selectively updating further comprises:

selectively updating, by the transit control plane node, the information corresponding to the first set of wireless clients and information corresponding to the second set of wireless clients associated with the second access point such that only the first fabric site is informed about updates involving the first set of wireless clients and only the second fabric site is informed about updates involving the second set of wireless clients associated with the second access point.

18. The apparatus of claim 11, wherein the transit control plane node is configured to:

publish client registration information to the first fabric site based on a domain identifier associated with the first access point, and publish client registration information to the second fabric site based on a domain identifier associated with the second access point.

19. The apparatus of claim 11, further comprising:

receiving, by the transit control plane node, registration information to establish a dummy client, wherein the registration information includes a routing locator associated with at least one of the first access point and the second access point, wherein the registration information further includes domain identification information corresponding to at least one of the first access point and the second access point; and publishing the registration information to at least one of the first fabric site and the second fabric site.

20. A tangible, non-transitory, computer-readable medium storing program instructions that cause a device to execute a process comprising:

receiving, by a transit control plane node from a wireless controller, information corresponding to a first access point associated with a first fabric site;

receiving, by the transit control plane node from the wireless controller, information corresponding to a second access point associated with a second fabric site;

registering, by the transit control plane node, a first set of wireless clients associated with the first access point and a second set of wireless clients associated with the second access point to provide network services to the first set of wireless clients and the second set of wireless clients associated with the second access point; and selectively updating, by the transit control plane node, the information corresponding to the first set of wireless clients associated with the first access point and the information corresponding to the second set of wireless clients associated with the second access point.

* * * * *